United States Patent
Langen

[19]

[11] Patent Number: 5,881,861
[45] Date of Patent: Mar. 16, 1999

[54] CIRCULATING CONVEYOR

[76] Inventor: Manfred Langen, Schulstrasse 58, D-41065 Mönchengladbach, Germany

[21] Appl. No.: 911,835

[22] Filed: Aug. 15, 1997

[30] Foreign Application Priority Data

Aug. 16, 1996 [DE] Germany .................. 196 32 933.7
Apr. 4, 1997 [DE] Germany .................. 197 13 903.5

[51] Int. Cl.$^6$ .................................................. B65G 25/00
[52] U.S. Cl. .................... 198/744; 198/748; 198/347.3
[58] Field of Search .............................. 198/347.1, 347.3, 198/347.4, 741, 744, 748

[56] References Cited

U.S. PATENT DOCUMENTS

| | | | |
|---|---|---|---|
| 3,826,349 | 7/1974 | Stevenson, III | 198/744 |
| 4,175,656 | 11/1979 | Lang | 198/748 |
| 4,476,973 | 10/1984 | Kesslet et al. | 198/744 |
| 5,115,907 | 5/1992 | Pomara, Jr. | 198/744 |
| 5,320,213 | 6/1994 | McIntosh et al. | 198/744 |
| 5,687,454 | 11/1997 | Langen | 198/347.3 X |

FOREIGN PATENT DOCUMENTS 0 423 519 A2  9/1990  European Pat. Off. .

*Primary Examiner*—James R. Bidwell
*Attorney, Agent, or Firm*—Kennedy Covington Lobdell & Hickman, LLP

[57] ABSTRACT

A circulating conveyor with roller and/or sliding guides, as well as with at least one engaging element for transporting articles to be conveyed, such as sliver cans, is described. In order to achieve that the circulating conveyor can convey and store simultaneously in two directions, at least two roller or sliding guides located next to each other are provided for conveying and storing in one or both longitudinal guide directions, wherein the engaging element can be driven along the guides.

1 Claim, 2 Drawing Sheets

CIRCULATING CONVEYOR

FIELD OF THE INVENTION

The invention relates to a circulating conveyor with roller and/or sliding guides, as well as with at least one engaging element for conveying, storing and/or positioning of articles to be conveyed, such a sliver cans, by pulling or pushing.

BACKGROUND OF THE INVENTION

In the textile industry slivers are transported from and to drawing frames as well as flyers and spinning machines with the aid of so-called sliver cans, cans for short. Following filling or emptying, each can is replaced by an empty or filled can. If necessary, the cans can be pulled or pushed individually or in groups on roller or sliding guides. Often, a large number of empty cans or full cans are transported, held and made available, and positioned for further transport between the drawing frames, flyers and spinning machines. It would therefore be advantageous if as many cans as possible could be simultaneously transported, held and positioned by means of the fewest possible driving devices.

OBJECT AND SUMMARY OF THE INVENTION

It is the object of the invention to further develop the circulating conveyor of the type mentioned at the outset in such a way that it is capable of conveying as well as storing the articles to be transported in both directions of the conveying track, i.e. the roller and/or sliding guides. The novel system should be capable of conveying different articles to be conveyed, for example empty cans, in the one direction and full cans in the other direction, to collect them and to store them in a defined position or to store them in defined areas of the system. At the same time the system should be capable of removing the articles to be conveyed and held in the storage areas again individually or in groups or to move them away, depending on the requirements at the user stations.

This object is attained in connection with the circulating conveyor mentioned at the outset having roller and/or sliding guides as well as at least one engaging element, in that at least two separate roller and/or sliding guides are provided for conveying, storing and/or positioning the articles to be conveyed. In principle it is possible to convey, store and/or position in both directions (forward or reverse).

In accordance with the invention, a circulating conveyor with roller and/or sliding guides, as well as with at least one engaging element for conveying articles to be conveyed, such as sliver cans, is provided. At least two roller or sliding guides placed next to each other for conveying and storing in one or both longitudinal guide directions are provided for achieving that the circulating conveyor can simultaneously convey, store and position in both directions, wherein the engaging element is to be driven along the guides.

The system in accordance with the invention consists of a circulating conveyor having at least one engaging element. The articles to be conveyed are transported via separate roller or sliding guides or are held on them. The roller or sliding guides are preferably arranged spatially parallel in respect to each other or extending next to each other. The engaging element is used for transporting, i.e. for pulling or pushing individual articles or groups of articles to be conveyed. The engaging element pushes or pulls the articles to be conveyed far as or into respectively predetermined positions, as required. By means of each individual engaging element of the circulating conveyor, the system can also pull the articles to be conveyed onto the sliding or roller guide (for example from a conveying means), and at the transfer end of the circulating conveyor can push off the articles to be conveyed (for example onto the next conveying means).

It is surprisingly possible to serve two or more parallel guides by means of a single retractable engaging element, for example pulling or pushing hooks or pins, simultaneously or sequentially, and that in opposite directions. In this sense a retractable engaging element is particularly variable if, among others, the following options are provided: the engaging element grips the respective article from behind or from below, or it slides along underneath the article in order to reach another work position on its track.

In general, articles to be conveyed can be pushed or placed on the start of the respective system. The respective engaging element pushes or pulls the article to be conveyed into the intended end position. A retractable engaging element can then be lowered and moved along underneath the one article or a plurality of articles to be conveyed, until it is given a new task at another place of the conveying system. Depending on the type of driving it is also possible to push or pull the engaging element in the one or the other direction. Within the framework of the invention it is surprisingly possible for a single engaging element to transport or to store several articles to be conveyed on roller or sliding guides located next to each other.

With a circulating conveyor in accordance with the invention it is possible to transport the respectively newly placed articles to be conveyed up to the already conveyed articles to be conveyed and to store them there when desired. If the conveyed article which was first held is removed out of its storing position, the conveying system in accordance with the invention can move the other held article or articles to be transported onward by one position, until the next article to be conveyed again reaches the end position.

It is often necessary to maintain the end positions exactly, i.e. the articles to be conveyed must be brought into an exactly determined or defined initial position for access by another transport means, a processing means, etc. In further accordance with the invention, either the same engaging elements which have already brought the articles to be conveyed, possibly for storing, or separate, retractable detents on the roller or sliding guides, can be provided for the defined positioning in the predetermined end positions in the storing stations.

In the first case, the engaging element can bring the articles to be conveyed in the direction of the said defined initial position, possibly at the end of the storage area, so that the front of the storage area extends slightly past the desired defined initial position. The engaging element can then be retracted and brought from the other side against the articles to be conveyed or the front of the storage area. There it can exactly align or position the articles to be conveyed which are ready for being taken away etc. in the required manner. Possibly the engaging element can alternately bring articles to be conveyed to the end of the storage area and then subsequently align the front of the storage area in a defined manner.

If the articles to be conveyed which had been first brought in are to be moved away, the separate detents provided in the other case can be briefly retracted, until the next article of a stored row reaches it. It is possible for the engaging element to push or pull the articles to be removed away during the time the detent is retracted. As stated, a detent can be retracted into the conveying track and extended again. It can also be pushed from the side or from above into the path of the articles to be conveyed. Only its function of defining the end position of the respective storage area is important.

In the system in accordance with the invention, one circulatingly driven engaging element can take over the same function for both directions for conveying and storing. In a surprising way it is then possible that a single engaging element is sufficient for the entire system with possibly several conveying tracks. Such an engaging element can be mechanically but also electronically controlled. As stated, it even can simultaneously convey or store several articles to be stored on roller or sliding guides located next to each other.

In connection with sliding guides in particular, the system in accordance with the invention is capable of compensating different heights of the machines or conveying means located ahead or behind without problems by placing the guides on an incline. However, the inclination of the conveying track must not be so steep that the articles to be conveyed slide into the lower position by themselves as a result of gravity. This would not be acceptable, for example in case of a transport from the lower side to the higher side, since the advantage of the arrangement consists in that the picked up articles to be conveyed are transported immediately to the removal side, remain there and are directly ready for removal.

Details of the invention will be explained by means of the schematic representation of exemplary embodiments.

DETAILED DESCRIPTION OF THE PREFERRED EMBODIMENTS

Figure 1:
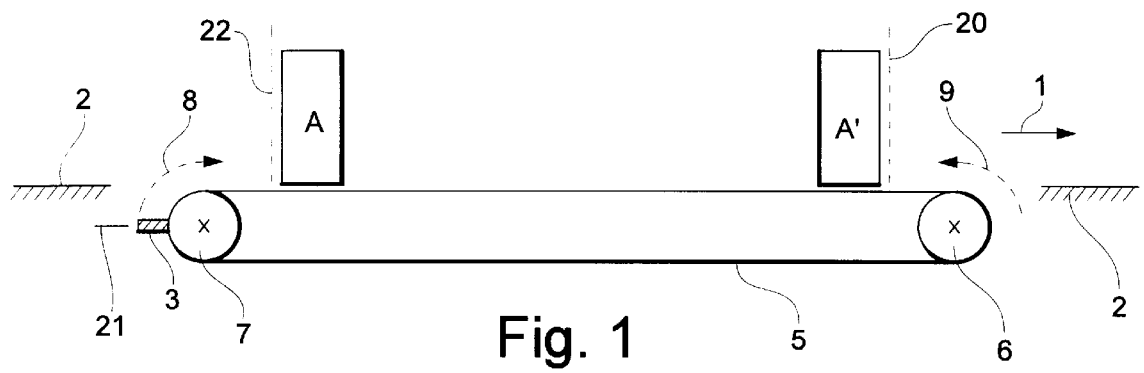
FIG. 1 is a schematic illustration of a circulating conveyor for conveying and storing sliver cans in accordance with the present invention, illustrating the conveyor being operable in opposite directions.
Figure 6:
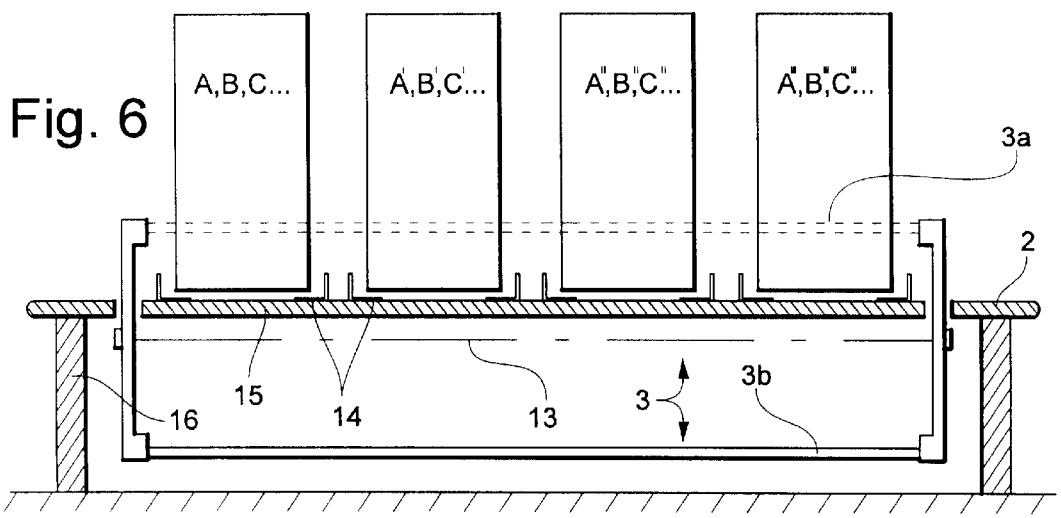
FIGS. 6 and 7 are schematic cross-sectional views of alternative circulating conveyors of the present invention.
Figure 7:
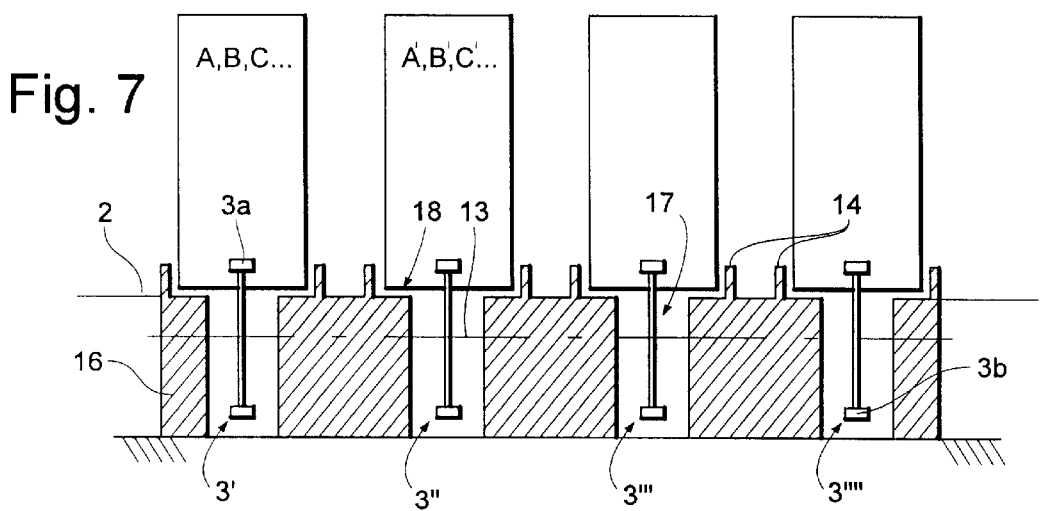

The circulating conveyor of the preferred embodiment of the present invention illustrated in FIGS. 1 to 5 can have two or more conveying tracks disposed in side-by-side relation. In FIGS. 6 and 7 four tracks are shown. FIG. 1 shows a track 1 with a can supporting bottom surface 2. The track can be used for conveying or storing cans. Roller guides may be provided on the conveying track or on the cans to facilitate conveyance. Similarly, a sliding guide may be provided on either the conveying track or on the cans being conveyed.

Figure 4:
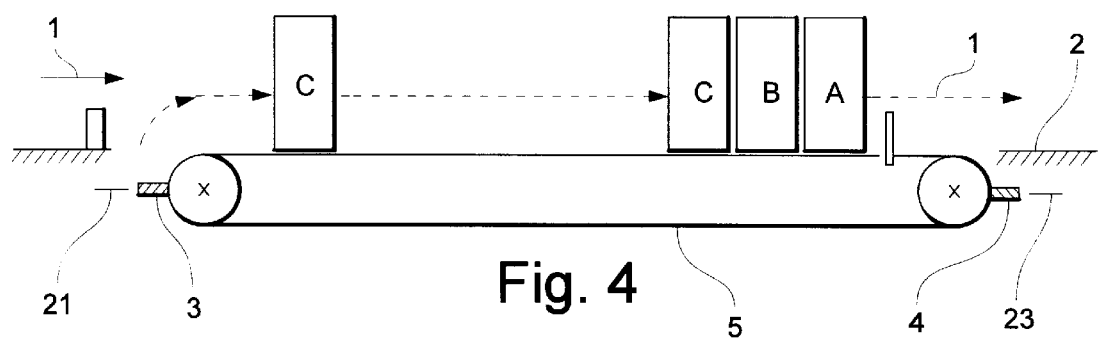

Two engaging elements 3 and 4 can be associated with each conveying track 1 in accordance with FIG. 4, for example, which elements can be driven by any arbitrary transport means, for example, an endless belt 5. The belt 5 is exposed in a slot in the can supporting surface 2 and can be driven in either the conveying or storage direction 8,9 over two rollers 6,7, at least one of which is driven, thereby moving the engaging elements linearly and causing the engaging elements to be retracted as the belt carries the engaging elements through the return side of the belt. A plurality of belts 5 and their associated engaging elements 3,4 may be disposed in separate, spaced slots on different tracks 1 for separate engagement and positioning of cans on different tracks. The belts are operable in a reverse direction for positioning the engaging elements for alignment of the engaging elements at the front of the leading can in a track to position the cans in a storage position.

If the engaging element belt 5 is driven in the direction 8, the engaging element 3 rises from below to above the bottom surface 2 in the direction of the arrow 8 and comes underneath or back of the can A to be conveyed. Subsequently this can is transported on the bottom surface 2 on, for example, a roller or sliding guide, in the direction of the arrow 8 into a position indicated in FIG. 1 for can A, for example. As required, the engaging element 3 can then be retracted or stopped or moved back. In particular, it can be lowered and moved in the opposite direction 9 to the front of the can A' to position the can for storage or in readiness for further conveying.

Figure 2:
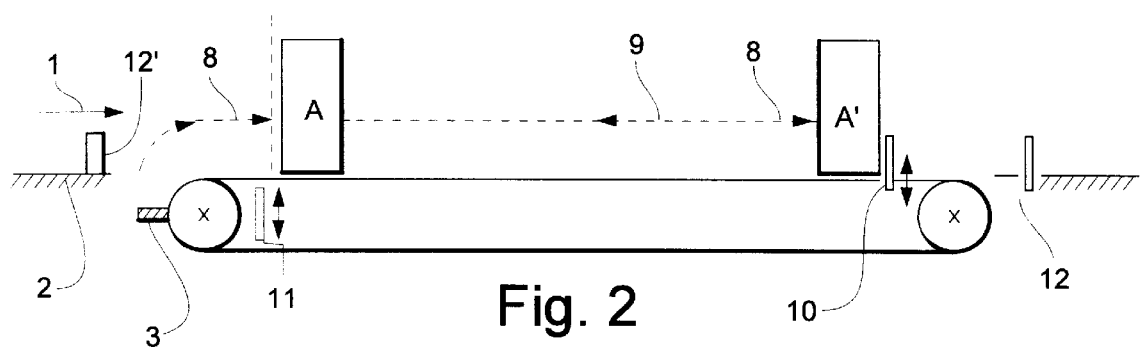
FIGS. 2 to 5 illustrate variations of the circulating conveyors of FIG. 1, with retractable engaging elements.

For the purpose of positioning of the front of a can train or a can A', a releasable detent 10 may be provided between tracks, as illustrated in FIG. 2, which detent is operated to be lifted or lowered in the indicated direction of the arrow. The detent 10 is preferably provided at a place where the engaging element 3 has not yet reached the other reversing roller 6. When this engaging element 3 has brought the can A to be conveyed to the detent 10, the detent retains the can A in a predetermined storage position and the engaging element can either reverse direction, in this case the second engaging element 4 need not be provided, or it can be lowered and moved on underneath the can A and the detent 10 in the conveying direction 8. In the latter case two or more engaging elements 4 can be provided which, respectively upon arrival of a new can B to be conveyed (FIG. 3), transport it from the area of the roller 7 until it comes to a stop against the already present can A to be conveyed. In FIG. 4 it is shown how a third can C to be transported is engaged by an engaging element 3 and transported to the storage area at the previously positioned can B.

Figure 3:
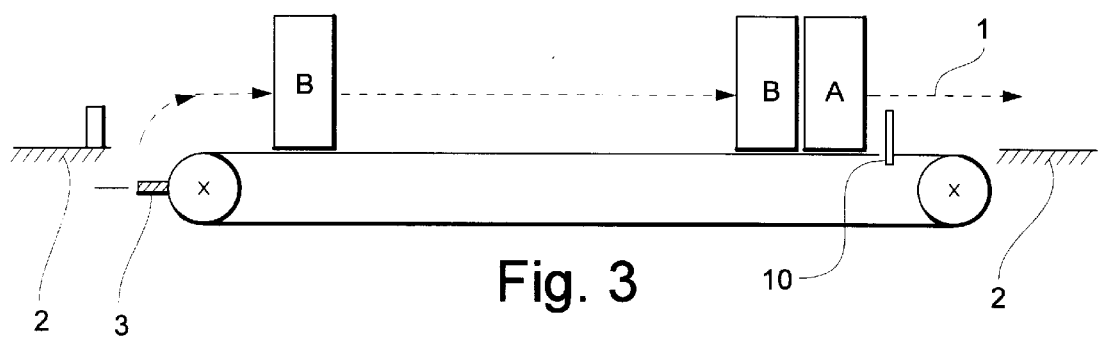

Incidentally, a detent such as the retractable detent 10 in FIGS. 2 and 3 can also be provided at other places of the conveying track 1. For example, a retractable detent 11 is represented in FIG. 2. The detent, for example the detent from FIG. 2 on the delivery side of the conveying system, can also be disposed on the side next to the area covered by the engaging element. A detent 12' on the conveying side of the bottom surface can also be advantageous for the operation.

Figure 5:
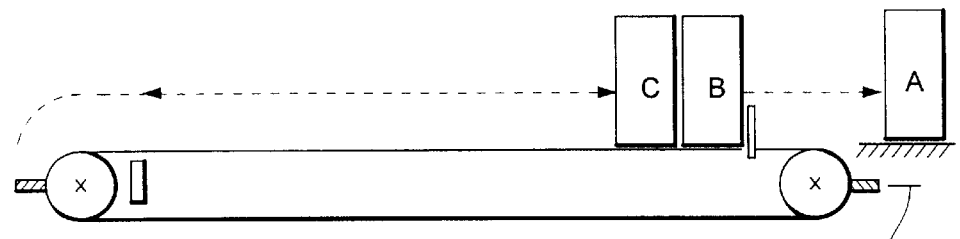

In FIG. 5 it is shown how the conveying and storage system in accordance with the present invention can transport not only in the forward conveying direction 8, but also in a reverse or opposite conveying direction 9. It is shown in the exemplary embodiment how it is possible to move a can A to be conveyed forward in the original direction 8, for example over the detent 10 of FIG. 2, while the other cans C and B to be conveyed can be conveyed back, namely in the opposite direction 9.

The sectional view in FIG. 6 shows an engaging element 3, which is pivotable around the axis 13, for example that of the rollers 6, 7, which can simultaneously push or pull four cans A to be conveyed. The cans to be conveyed can be displaceably seated, for example in sliding guides 14.

Among other things, the respective detent 10 in FIGS. 2 and 3 is used to align or place the front of the storage area in a defined manner, so that the articles located in the front of the storage area can be definitely removed and/or taken for further processing with the aid of other transport means. But the conveying and storage system can make do without the separate detent if the respective engaging element 3, which takes the cans A, B, . . . to the end of the storage area, can respectively bring the entirety of stored cans slightly farther, i.e., past a defined removal position. The same engaging element can then be guided, for example retracted past the storage area, to the front of the storage area and align it in the desired manner. It is advantageous that all engaging and detent work can be performed automatically, for example program-controlled.

It is possible in accordance with the invention that a single engaging element 3 can be sufficient for the entire conveying and holding or storage, in the same way as a single railroad shunt engine in a marshalling yard. In accordance with this aspect of the invention, two or more separate conveying tracks in accordance with FIG. 6 of the type described by means of FIGS. 1 to 5 are placed next to each other, so that it is possible to simultaneously convey in both directions 8 and 9. As stated, a single engaging element 3 can be sufficient for conveying in both directions if the engaging element can be extended or retracted in one or the other position or function. The single engaging element can transport sequentially on one conveying track in the one direction and on the other conveying track in the other direction, or pushing or pulling or storing cans to be conveyed simultaneously on both conveying tracks in the same direction. FIG. 6 shows an engaging element 3 which is common for several conveying tracks 1 located next to each other, and is rotatably mounted for rotation in opposite directions, for example, reversed at the axes 13 of the rollers 6, 7 (FIGS. 1 to 5), into a position 3a above the sliding guides 14 of the cans to be conveyed, and into a position 3b below the sliding guides 14. The sliding guides 14 are installed, for example on transverse supports, which can rest on stands 16.

An alternative of FIG. 6 is represented in FIG. 7. In this case the retractable engaging elements 3 are underneath the cans A, B, C, . . . , even with the upper part of the belt 5. The cans are pulled or pushed by the action of the engaging elements from below, for example under an edge, or by pushing against a lower edge of the article. Separate engaging elements 3', 3",3'", 3"" are associated with each conveying track, which are preferably guided in respective spaces or slots 17, oriented in the longitudinal direction of the conveying track. The slots 17 can be provided, for example, in transverse extents 15 of FIG. 6, which are supported on stands 16 between adjacent slots 17. The engaging elements 3 projecting upward through the slots 17 can act against or under the bottom 18 of the cans A, B, C, . . . .

EXEMPLARY EMBODIMENTS IN ACCORDANCE WITH THE INVENTION

Example 1

A circulating conveyor with an engaging element 3 in accordance with FIGS. 3 and 6 is arranged for operation with several sliding guides 14, for simultaneous transport, storage, or otherwise positioning several cans A, A', A", A'", etc.

The engaging element is located above (position 3a) the sliding guides 14 when it manipulates the cans, and runs underneath (in position 3b) the sliding guides 14 when it is intended to move to the other end of the can or a can train A, B, C . . . , for example, for positioning following the conveying and storing.

In the position 3a the engaging element 3 can push cans onto a conveying track or remove them from a conveying track. In the position 3b, after conveying or storing a can or a can train, the engaging element can get to the other end in order to position this end in a defined manner.

If the engaging element 3,4 continuously manipulates the cans above the guides 14, the axes of rotation 13 should be located underneath the transverse support 15, and the stands 16 should be outside the engaging element belt 5 or the engaging element 3,4.

Example 1A

The system comprises one engaging element 3, but no detents 10 to 12:

For the defined setting of the front of the cans or the like in a 0-position or alignment position 20, after conveying a can A in the conveying direction 8, the engaging element 3 must return in the opposite direction 9 to the 0-position or alignment position 20, position the can A standing there, and subsequently must be brought back in the conveying direction 8 into its base position 21 or its conveying position 22 (FIG. 1) for further conveying jobs. The same applies for the following cans B, C, . . . , i.e., a relatively large amount of time is required for positioning the front of the cans. In this so-called reversing operation, 21 is the base position of the engaging element 3. In order to reach its alignment position 20, the element must travel the comparatively long distance underneath the respective guides 2 or 14.

Example 1B

The system comprises one engaging element 3 and additional detents 10, 11, 12 and 12'.

The detents reduce the additional amount of time required for positioning to almost zero, but require a large mechanical and technical control cost. In the embodiment in accordance with Example 1A (without detents) this cost is relatively small.

Example 1C

The system comprises two engaging elements 3 and 4, but no detents.

In this case the engaging element 4 takes over the positioning, namely from a base position 23 (FIG. 4). It inevitably reaches this base position when the engaging element 3 is to return to the base position 21 after each movement. The base positions 21,23 of the engaging element 3 and the engaging element 4 are located exactly opposite each other and are connected to the engaging element belt 5. The detents 10,11,12,12' can also be used with this embodiment, but the cost is large in comparison with the relatively small loss of time when positioning with the aid of the second engaging element 4.

Example 2A

In the alternative in accordance with FIG. 7, the cans A, B, C, . . . to be conveyed can be transported, stored and/or positioned from the front and/or from below by pushing or pulling. To this end a separate retractable engaging element 3 is required under each sliding guide or between each sliding or roller guide.

If the cans are only to be pushed, as in Example 1, no retractable engaging elements are needed here, either. In this case transporting, storing and positioning always takes place by pushing against the outside of the article to be conveyed.

However, in every case the cost is relatively high, since an engaging element with an engaging element belt and two reversing rollers are required for each pair of sliding guides (row of cans), and supports for each guide rail are necessary. However, the inner guides can be combined in pairs by means of respectively one support. In comparison, in accordance with Example 1, four reversing rollers and two engaging element belts are required for four conveying tracks. In contrast thereto the embodiment in accordance with Example 2A requires eight reversing rollers and four engaging element belts. But there is the advantageous option of being able to drive the individual rows of articles independently of each other (holding, storage, positioning).

Example 2B

It is basically possible in connection with the alternative in accordance with FIG. 7 to provide a linear drive for the engaging elements in place of the circulating construction. Because of this it is possible to limit the range of functions or actions of the engaging elements to the actual conveying path of the articles to be conveyed. For example, a cylinder-piston mechanism can be employed as the linear engaging element drive.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A conveyor for conveying, storing, or positioning articles, such as textile sliver cans, thereon, comprising:

at least two guides mounted on said conveyor for guiding articles being conveyed, stored, or positioned thereon, said two guides defining at least two conveying tracks extending in side-by-side relation; and at least one engaging element extending across at least two of said conveying tracks and fixedly mounted on an endless conveyor belt for movably engaging one or more articles simultaneously on all of said at least two conveying tracks to convey articles thereon; said engaging element capable of conveying articles to any position along said conveying tracks.

* * * * *